United States Patent [19]

Goldenberg et al.

[11] Patent Number: 4,824,227
[45] Date of Patent: Apr. 25, 1989

[54] OPTIMUM RISER ANGLE FOR FRESNEL LENSES IN PROJECTION SCREENS

[75] Inventors: Jill F. Goldenberg, Pelham Manor; T. Stewart McKechnie, Ossining, both of N.Y.

[73] Assignee: North American Philips Corporation, New York, N.Y.

[21] Appl. No.: 800,012

[22] Filed: Nov. 20, 1985

[51] Int. Cl.⁴ ................................................ G02B 3/08
[52] U.S. Cl. .................................................... 350/452
[58] Field of Search ......................................... 350/452

[56] References Cited

U.S. PATENT DOCUMENTS 2,200,646  5/1940  Strong et al. ................... 350/452 X
4,076,384  2/1978  Daml et al. ..................... 350/452 X
4,398,810  8/1983  Hodges et al. ....................... 350/452
4,457,594  7/1984  Hodges ............................... 350/452

Primary Examiner—John K. Corbin
Assistant Examiner—Scott J. Sugarman
Attorney, Agent, or Firm—Marianne R. Rich

[57] ABSTRACT a Fresnel lens for use in rear projection screens wherein said lens has a plurality of facets facing away from the light source and each of said facets has an optimal riser angle, said riser angle varying from the center to the outer edge of said lens as a function of the focal length the refractive index, the angular subtense of the exit pupil and the radial distance from the center of the lens, thereby improving the efficiency of the Fresnel lens.

12 Claims, 5 Drawing Sheets 4,824,227

OPTIMUM RISER ANGLE FOR FRESNEL LENSES IN PROJECTION SCREENS

BACKGROUND OF THE INVENTION

1. Field of the Invention

The present invention pertains to Fresnel lenses for use as a component of a viewing screen for projection systems, specifically as an element of a screen for a multi-tube rear projection system. The Fresnel lens has facets with riser angles which vary as a function of their radial distance from the center of the lens, the variation being approximated by a linear function. The Fresnel lens according to the present invention has an increased efficiency over lenses according to the prior art, providing high resolution capability.

2. Description of the Prior Art

Consumer based rear projection television (PTV) systems typically include three CRTs which form the red, green and blue portions of the TV picture. Three projection lenses magnify these images and converge them into a single plane. The viewing screen is placed in this plane.

Most rear PTV systems utilize a two part screen in which a lenticular array and black stripes are incorporated into the front part while a Fresnel lens is arranged on the rear part of the screen. The linear lenticular array distributes light horizontally and black stripes may be introduced to increase the image contrast by reducing the ambient room light reflections. The registration between the black strips and the lenticular array must be controlled with high accuracy so that the TV picture is unaffected by the presence of the stripes. The Fresnel lens directs the projected light toward the viewing audience through a diffuser which is incorporated into the screen for vertical spreading. The amount of horizontal and vertical spreading defines the dimensions of the audience space. Screens in the prior art have been made in either one or two pieces, and for rear or front projection.

The optical performance of the conventional black stripe screens is limited in terms of the size of the audience space, color shift, resolution, mechanical stability and other factors.

The purpose of the Fresnel lens is to increase the field of view of the PTV system. In effect it acts as a field lens. It is designed to image the exit pupil of the projection lens to the plane of the viewing audience. Without a field lens, viewers in the center of the viewing space would only see the information from the center of the cathode ray tube. With the field lens, the rays are bent toward the viewer so that he can see the entire picture. Since a Fresnel lens is located at the image plane of the projection lenses, it introduces no aberrations.

Further information about PTV systems and in particular rear projection TV screens may be had from U.S. patent application Ser. No. 567,101, filed Dec. 30, 1983, now U.S. Pat. No. 4,573,764 which is hereby incorporated by reference.

Projection TV systems and Fresnel lenses for use therein have been known in the prior art.

Typically, the Fresnel lenses used in the display apparatus whose riser angles are constant. In U.S. Pat. No. 4,391,495 it is mentioned in passing that the riser angle "is coincident with a pencil of light traveling through the system to the exit pupil". There is no appreciation in U.S. Pat. No. 4,391,495 that this ideal solution cannot be achieved with an extended light source.

SUMMARY OF THE INVENTION

The invention pertains to an improved Fresnel lens for use in projection television screens. In the typical scheme of a projection television system, three tubes form the red, green and blue images, respectively. Three lenses subsequently magnify these images and project them into a single plane. The screen is placed in this plane to redirect the light toward the viewing audience. Since most of the viewers are located at generally the same vertical position but are spread out horizontally, the screen spreads the light out further in the horizontal direction than in the vertical direction. Therefore, with the same light output from the tubes, the use of a well designed screen can increase the brightness in the viewing area by typically three to five times.

The screen acts first as a field lens to bend the ray bundles back toward the axis. It then diffuses light into a desired half-cone angle and it horizontally spreads the light as widely as possible. A screen typically includes an element with a lenticular surface, a light diffusing structure and a second element containing a Fresnel lens.

The present invention relates to the design of the riser angle of the facets of the Fresnel lens for the purpose of improving the efficiency, color balance and resolution of a projection screen. The principal objects of the invention are to maximize the light throughput of the screen, increase the resolution of the Fresnel lens and to improve the color balance of the picture.

In the present invention the Fresnel lens has facets with riser angles which vary as a function of their radial distance from the center of the lens according to a relationship which can be approximated by a linear function. This variation of the riser angles will increase the efficiency of the Fresnel lens and balance the percentages of light lost from the two extreme displaced lenses. Consequently, the invention is a Fresnel lens for use in rear projection screens used in projection systems wherein the system has light coming from a projector having a finite sized exit pupil or an effective exit pupil of the projection system being a combination of multiple individual exit pupils of the separate projectors. Typically, there are three exit pupils corresponding to the three color projectors. The larger the angular subtense of the effective exit pupil subtended in the screen plane, the greater will be the improvement in performance of the Fresnel lens due to the optimized riser angle.

In particular, the riser angle is varied from the center to the outer edge of the lens as a function of the focal length of the lens, the refractive index of the lens and the angular subtense of the pupil. The invention presents a precise equation for calculating the riser angle of each facet of the Fresnel lens which varies according to a relationship which can be approximated by a linear function. The riser angle increases with the distance from the center of the lens to the outer facet. For practical considerations, the riser angle generally must be above a certain minimum angle to permit manufacturing of the lens by a molding technique.

DESCRIPTION OF THE PREFERRED EMBODIMENT

The preferred embodiment will be described in the context of a commercially available rear projection television system (PTV) by way of example only. It should be understood that the invention is not limited thereto.

Figure 1:
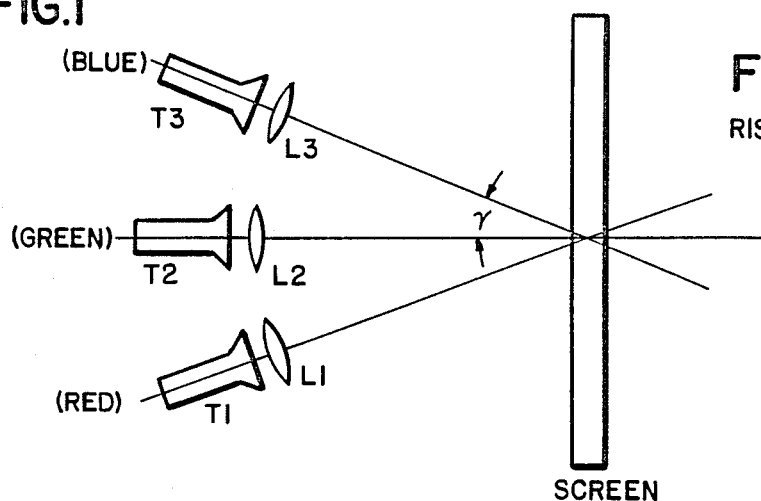
FIG. 1 is a schematic of a rear projection TV system.

FIG. 1 is a schematic view of a rear projection television system (PTV). The three tubes T1, T2, and T3 form the red, green and blue images respectively. Lens L1, L2, and L3 subsequently magnify these images and project them into a single plane. The angle $\gamma$ is the angle of convergence. The screen is placed in this plane to redirect the light toward the viewing audience. The screen itself has been described in some detail in an article entitled "Ultrawide Viewing Angle Rear Projection Television Screen", IEEE Transactions on Consumer Electronics, August, 1985. One component of the screen is a Fresnel lens which acts as a field lens by bending the ray bundles toward the viewing audience.

Figure 2:
FIG. 2 is a schematic view illustrating the riser angle of a Fresnel lens.

The invention relates to the design of the riser angle of the Fresnel lens as a function of the radial distance from the center of the lens. FIG. 2 defines the riser angle $\Psi$, which is the angle between a line projected perpendicularly from the screen or lens substrate and the rising surface of the facet of the Fresnel lens. The purpose of the invention is to increase the efficiency of the Fresnel lens and balance the percentages of light lost from T1 and T3. Each lens has a finite sized exit pupil of radius t. The effective exit pupil of the three lens projection system is a combination of the exit pupils of the three lenses. The Fresnel lens is designed to image the effective exit pupil of the projection lens to the plane of the viewing audience. (Since the viewers are sitting at a large distance from the Fresnel lens, this distance can be approximated by infinity.)

Figure 3A:
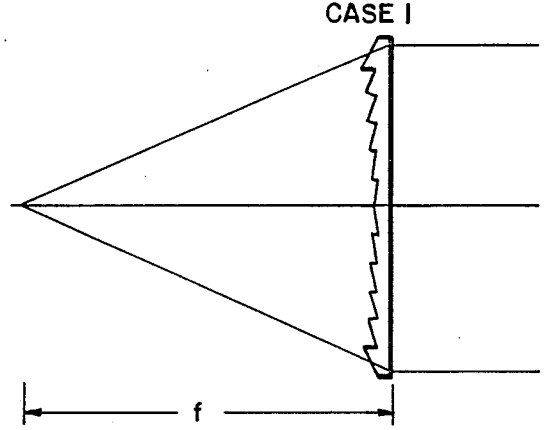
FIGS. 3a and 3b show two possible Fresnel lens configurations in cutaway side views.
Figure 3B:
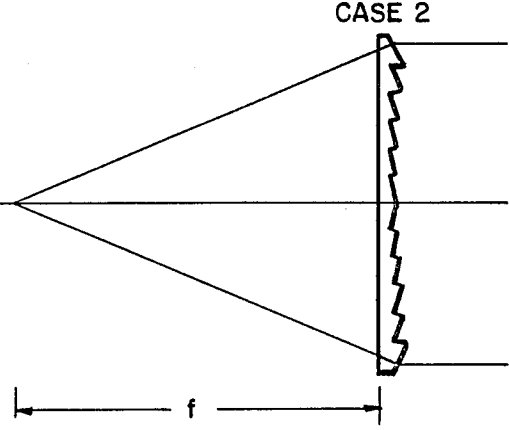

FIGS. 3a and 3b indicate the two possible Fresnel lens cofigurations. For purposes of simplification, we will refer to the configuration shown in FIG. 3a as case I and the configuration shown in FIG. 3b as case II. Although case I lends itself to a one-piece screen (the lenticular surface can be molded onto the back surface), this design is less efficient than case II. The facet angles for case I and case II lenses are different.

In a case I Fresnel lens, the facets are facing the light source. The focal length is given by f.

In a case II Fresnel lens, the facets are facing away from the light source. The focal length is given by f.

The focal length, f, of the Fresnel lens of a PTV screen is typically equal to the distance from the exit pupil of the projection lenses to the screen plane. The maximum dimension of the Fresnel lens is the diagonal of the TV picture. Since f is approximately equal to the diagonal, the Fresnel lens is operating at approximately F/1.

Figure 4:
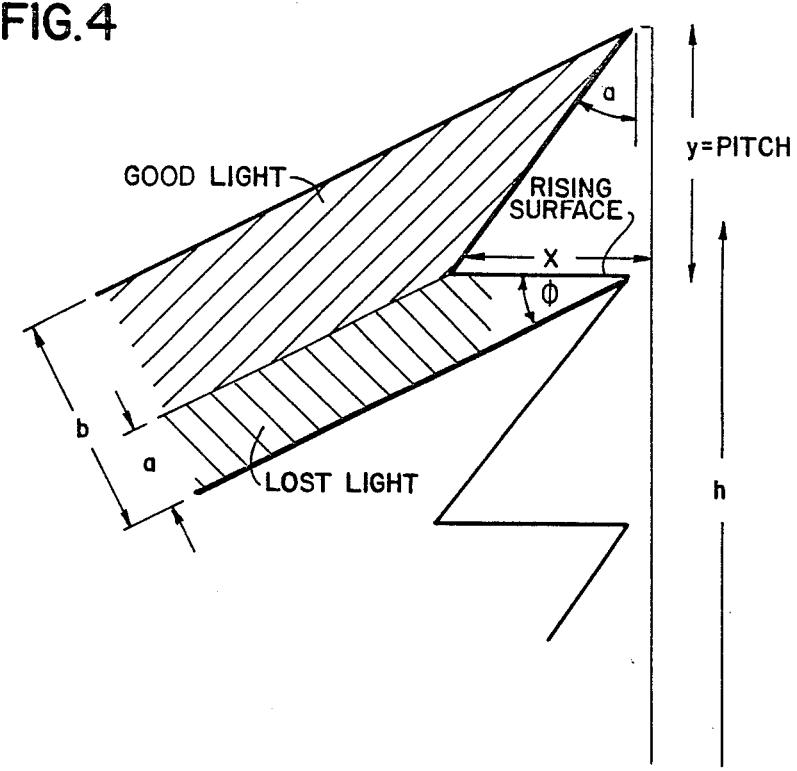
FIG. 4 is a schematic of two facets of a case I Fresnel lens.

FIG. 4 is a schematic of two facets of a case I Fresnel lens. This figure indicates the portion of the wavefront which hits the rising surface and is considered lost. The percentage of lost light is given by a/b. The facet angles are given by $\alpha$ and h is the distance from the facet to the center of the lens. The rays which hit the rising surface are either misdirected or lost but will be considered lost. The percentage of the lost light is given by $$\% \text{ lost} = 100 \frac{a}{b}, \tag{1}$$

where a and b represent portions of the wavefront incident at the facet. For a case I Fresnel lens, the angle of the facet is typically designed to collimate incoming rays and is given by $$\tan(\alpha) = \frac{\sin(\phi)}{n - \cos(\phi)}, \tag{2a}$$

where $$\phi = \tan^{-1}\frac{h}{f}, \tag{2b}$$

h is the radial distance of the facet from the center of the lens and n is the index of refraction of the Fresnel lens. If y is the pitch of the facets and x is the length of the rising surface, then $$\tan(\alpha) = \frac{x}{y}, \tag{3}$$

and $$\sin(\phi) = \frac{a}{x}. \tag{4}$$

Therefore, $$a = y \tan(\alpha) \sin(\phi). \tag{5}$$

The distance b can be given by $$b = y \sin(90 - \phi), \tag{6a}$$

$$b = y \cos(\phi). \tag{6b}$$

Substituting Eqs. 5 and 6b into 1 we find that the percentage of light lost in a facet at a distance h from the center of the lens is given by, $$\% \text{ lost} = 100 \tan(\alpha) \tan(\phi). \tag{7}$$

Since $\phi$ is zero for rays incident at the center of the lens, no light is lost for central rays. As h increases, so does the percentage of lost light. For an F/1 lens, approximately a third of the light is lost for the outermost facets. As a result, an F/1 Fresnel lens is extremely inefficient if used in the configuration shown in case I. The rays which hit the rising surface have been considered lost. In fact, some of this light will reach the final image plane, but in a location other than the ideal image point. This results in a loss of resolution.

The case II Fresnel lens presents significant improvement with respect to efficiency and resolution.

Figure 5:
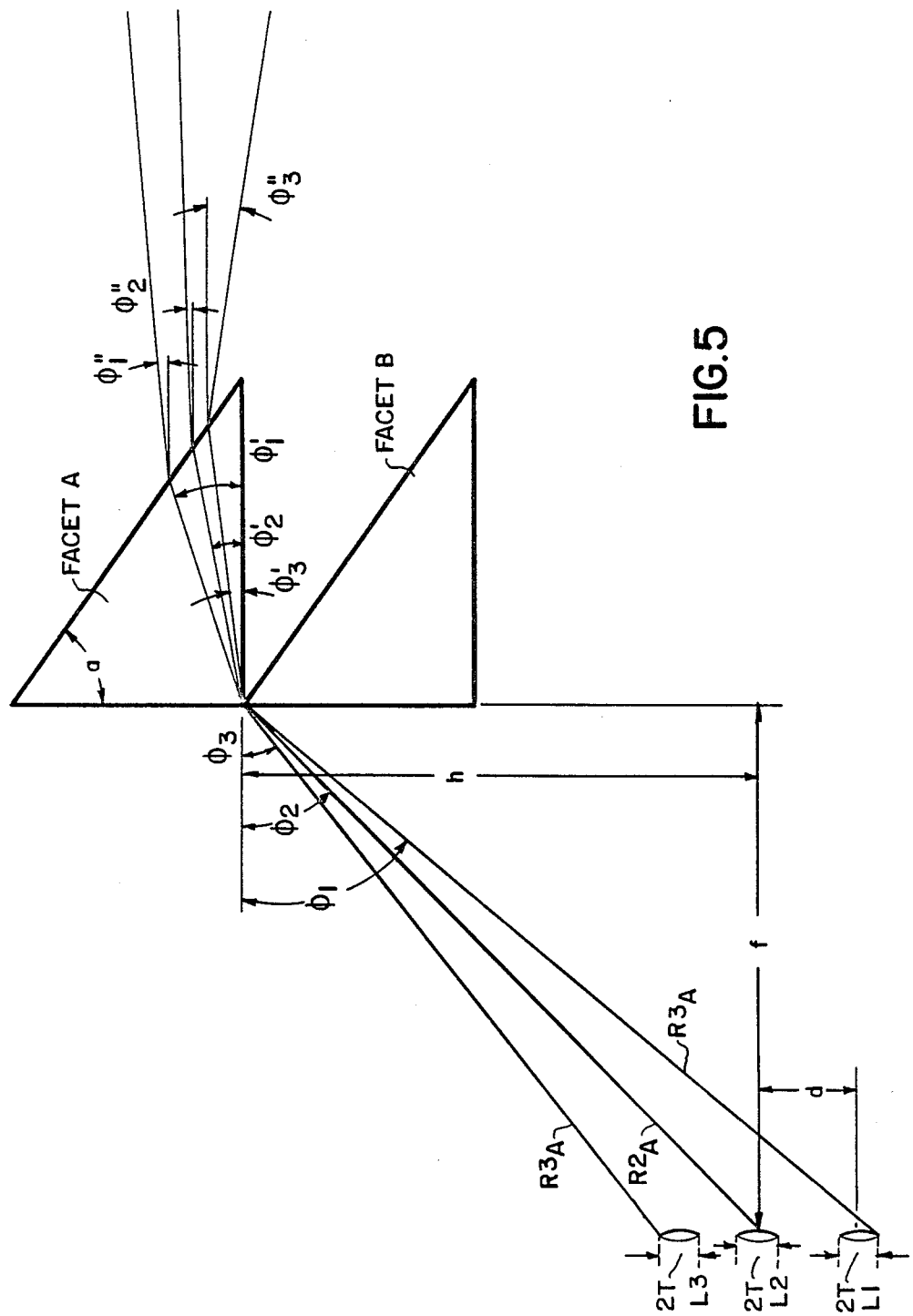
FIG. 5 is a schematic view of two facets of a case II Fresnel lens showing the extreme rays from L1 and L3 and the principal ray from L2.

FIG. 5 is a schematic of two facets of a case II Fresnel lens and the extreme rays from L1 and L3 and the principal ray from L2. Case II Fresnel lenses have 100% efficiency (ignoring Fresnel reflections) for all rays from the center tube (T2), but some of the rays from Tubes 1 and 3 will be incident at the rising surface and will be misdirected. In this section, the optimum riser angle $\Psi$ will be found which minimizes the losses. The riser angle is defined in FIG. 2.

For a case II Fresnel lens, the angle of each facet, $\alpha$, is chosen to collimate principal rays from the center lens and is given by $$\tan(\alpha) = \frac{n\sin(\phi_2')}{n\cos(\phi_2')-1}, \tag{8a}$$

where $\phi_2'$ is the angle of the principal ray from L2 in the facet, and is given by $$\sin(\phi_2') = \frac{1}{n} \frac{h}{(f^2 + h^2)^{\frac{1}{2}}}. \tag{8b}$$

In FIG. 5, h is the distance from the facet to the center of the lens and f is the focal length of the lens. t is the exit pupil radius and d is the transverse distance between exit pupils. L1, L2 and L3 indicate the red, green and blue lens systems. The ray labeled $R1_A$ is from the lower edge of the exit pupil of L1. The ray labeled $R2_A$ is the principal ray of L2. The ray labeled $R3_A$ is from the upper edge of the exit pupil of L3. The angles of $R1_A$, $R2_A$ and $R3_A$ (with respect to the normal of the first surface) are $\phi_1$, $\phi_2$ and $\phi_3$, the incoming angles of the rays. $\phi_1'$, $\phi_2'$ and $\phi_3'$ are the angles of the rays in the facet. $\phi_1''$, $\phi_2''$ and $\phi_3''$ are the angles of the rays after refraction. Since the lens collimates the principal ray from L2, $\phi_2''=0$.

The angles of the incident principal rays with respect to the normal of the first surface are given by $\phi_1$, $\phi_2$ and $\phi_3$ from lenses L1, L2 and L3 respectively, $$\phi_1 = \tan^{-1}\left(\frac{h+t+d}{f}\right), \tag{9a}$$

$$\phi_2 = \tan^{-1}\left(\frac{h}{f}\right), \tag{9b}$$

$$\phi_3 = \tan^{-1}\left(\frac{h-t-d}{f}\right), \tag{9c}$$

where d is the transverse separation of the exit pupils. The refracted angles, $\phi_1'$, $\phi_2'$ and $\phi_3'$ can be calculated by using Snell's Law. (Angle $\phi_2'$ is given by Eq. 8b.)

$$\phi_i' = \sin^{-1}\left(\frac{\sin \phi_i}{n}\right); i = 1, 2, 3. \tag{10a}$$

Since $\phi_1 > \phi_2 > \phi_3$ (see Eqs. 9a-9c), $\phi_1' > \phi_2' > \phi_3'$. If h is greater than d+t, $\phi_3' > 0$, and if the riser angle is less than or equal to $\phi_3'$, $R1_A$, $R2_A$ and $R3_A$ will pass through facet A unobstructed. This is a first partial solution to the lens design, namely that the riser angle is less than $\phi_3'$.

By using Snell's Law again, the angles of the rays after refraction at the facets ($\phi_1''$, $\phi_2''$ and $\phi_3''$) can be calculated:

$$\phi_i'' = \alpha - \sin^{-1}[n \sin(\alpha - \phi_i')]; i=1, 2, 3. \tag{10b}$$

Figure 6:
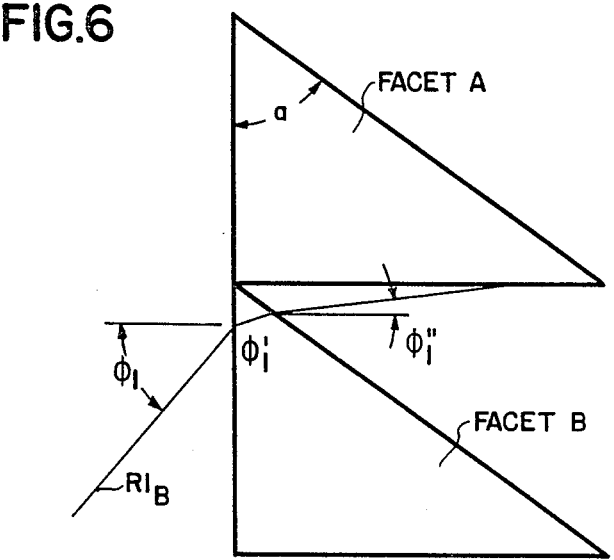
FIG. 6 is a schematic view of several facets of a Fresnel lens showing rays which intersect the rising surface and which would consequently be misdirected.

FIG. 6 indicates an extreme ray $R1_B$ from L1 passing through the facet B. Although it is unobstructed in the lower facet B, it is incident at the rising surface of the facet A and will therefore be lost if its angle is greater than the riser angle.

If $\phi_1''$ is greater than the riser angle, the ray $R1_B$ (a ray from tube 1 that passes through facet B) will be lost or misdirected when it intersects the rising surface of the facet above (facet A). Thus, the second partial solution is that the riser angle must be greater than $\phi_1''$.

The facets are designed so that $\phi_2''$ is equal to zero. By geometry, it is clear that $\phi_1''$ will be greater than zero and $\phi_3''$ will be less than zero.

In summary, there are two loss mechanisms associated with the riser surface:

1. If $\Psi > \phi_1'$ or $\Psi > \phi_2'$ or $\Psi > \phi_3'$ light in the facets will hit the rising surface.

Solution 1: $\Psi < \phi_3'$.

2. If $\Psi < \phi_1''$ rays that have already passed through the facet will hit the rising surface of the facet above.

Solution 2: $\Psi > \phi_1''$.

Figure 7:
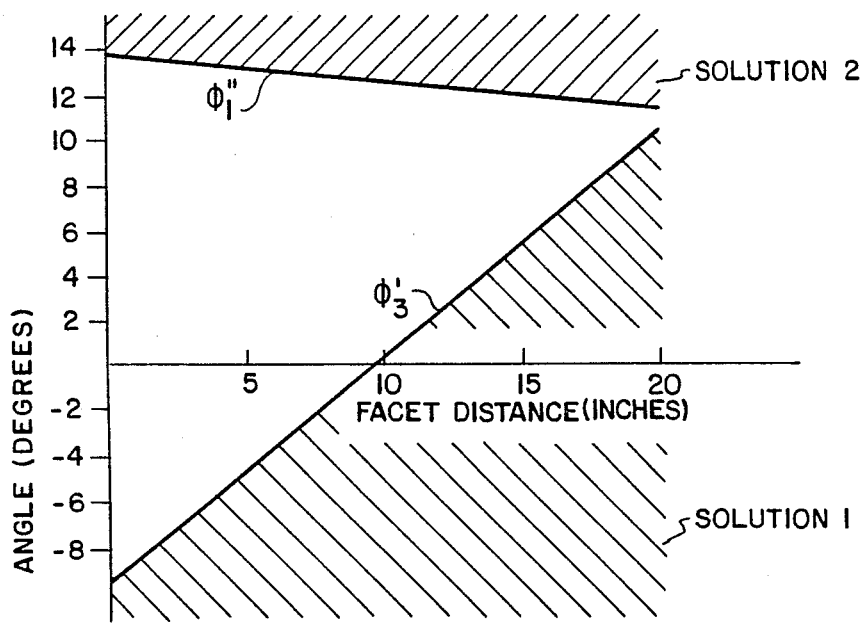
FIG. 7 is a plot of typical riser angles as a function of the distance from the center of the lens to its periphery, and the optimum riser angle.

FIG. 7 contains two plots. The first, $\phi_3'$—vs—h, indicates the angle of the lowest ray in the facet. Ideally, the riser angle should be less than $\phi_3'$ (solution 1). The second, $\phi_1''$—vs—h indicates the angle of the highest ray after refraction. Ideally, the riser angle should be greater than $\phi_1''$ (solution 2). By investigating these plots and solutions 1 and 2, we find that no function for the riser angle will satisfy both of these solutions. However, it can be shown that the optimal riser angle is the average of $O_3'$ and $O_1''$.

Figure 8A:
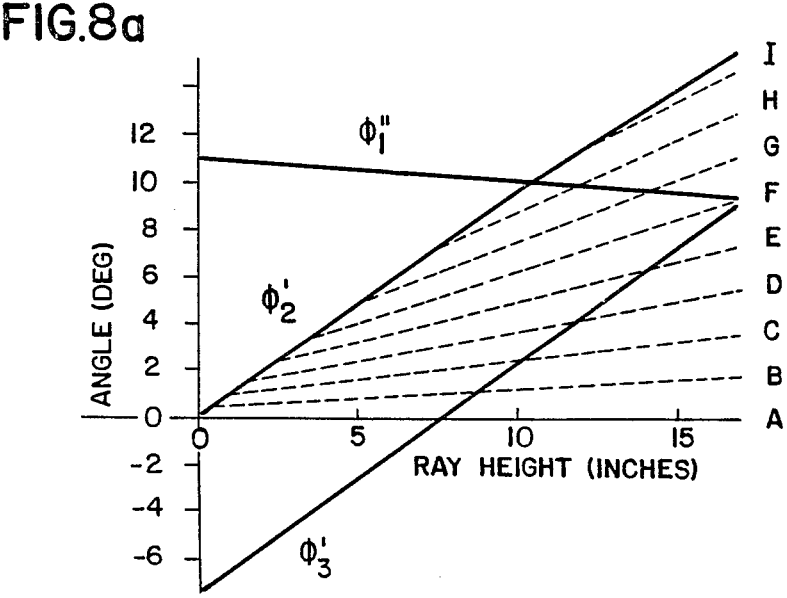
FIGS. 8a and 8b show plots of possible functions for a riser angle and the loss of efficiency for each.
Figure 8B:
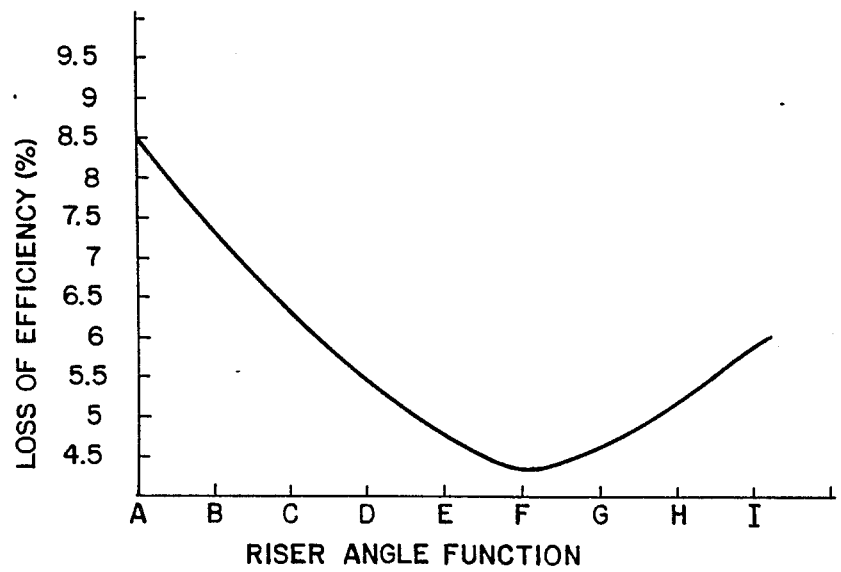

FIG. 8a indicates nine possible functions (A–I) for the riser angle as a function of radial distance. So that all of the light from the center tube passes through the Fresnel lens, the riser angle is always less than $\phi_2'$. FIG. 8b contains plots of the loss of efficiency for each riser angle function (A–I). Note that minimum loss, and therefore the highest efficiency occurs when the riser angle is the average of $\phi_1''$ and $\phi_3'$, i.e., function F. Hence the optimal riser angle is the average of these two angles.

Figure 9:
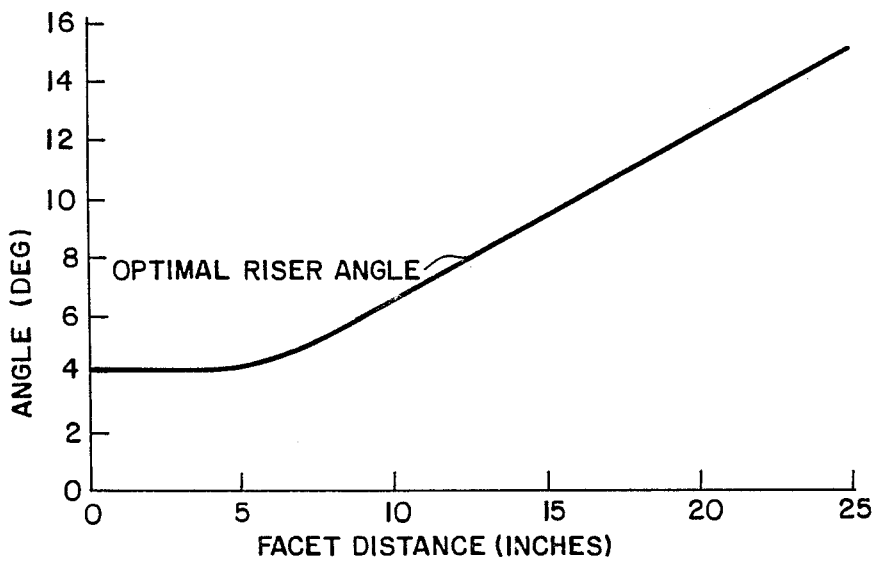
FIG. 9 is a plot of the riser angle function assuming a minimum riser angle required for manufacturing purposes.

For manufacturing reasons, a minimum riser angle ($\Psi_{min}$) is required. The actual riser function is shown in FIG. 9.

We claim:

1. A projection lens system comprising
an extended light source emitting a first extreme ray and a second extreme ray at respective extremities thereof;
a Fresnel lens having a base surface and a plurality of lens elements on said base surface, each lens element having a refracting surface and a riser surface, the riser surface of a first of said elements intersecting said base surface and the refracting surface of a contiguous one of said lens elements along a line;
and wherein each of said riser surfaces is at an optimal riser angle with respect to said base, said optimal riser angle varying as a function of the distance of said riser surface from the center of said Fresnel lens.

2. The projection lens system of claim 1, wherein said riser angle is optimized for a rear projection television screen.

3. The projection lens system of claim 1, wherein said the riser angle is optimized for an ultrawide viewing angle television screen.

4. The projection lens system of claim 1, wherein said lens elements face the viewing side of said screen.

5. The projection lens system as set forth in claim 1, wherein said extended light source comprises a first, second and third projection tube, said first projection tube emitting said first extreme ray and said third projection tube emitting said second extreme ray.

6. The projection lens system as set forth in claim 5, wherein, for a given one of said lens elements, said first extreme ray is refracted at a first angle by said refracting surface of said contiguous one of said lens elements in close proximity to said line, and said second extreme ray is refracted by said base of said given element at a second angle;

and wherein said optimal riser angle for said riser surface of said given element is the average of said first and second angles.

7. The projection lens system as set forth in claim 1, wherein said optimal riser angle is the riser angle minimizing the light loss through said Fresnel lens.

8. The projection lens system as set forth in claim 1, wherein said optimal riser angle varies substantially linearly with said distance from said center of said Fresnel lens.

9. The projection lens system as set forth in claim 8, wherein said optimal riser angle has a predetermined constant value exceeding zero starting at said center of said Fresnel lens;

and wherein said optimal riser angle changes to said substantially linear variation when said substantially linear variation is equal to said constant value.

10. A Fresnel lens receiving light from an extended light source emitting a first extreme ray and a second extreme ray at respective extremities thereof, said Fresnel lens having a plurality of lens elements on a base surface, each lens element having a refracting surface and a riser surface, the riser surface of a first of said elements intersecting said base surface and the refracting surface of a contiguous one of said lens elements along a line, said first extreme ray being refracted to a first incoming angle with respect to a perpendicular to said base surface;

wherein said riser surface is at a riser angle with respect to a perpendicular to said base surface; and wherein said riser angle is at least equal to said first incoming angle so that said first extreme ray is not refracted by said riser surface.

11. A Fresnel lens in combination with an extended light source emitting a first extreme ray and a second extreme ray at respective extremities thereof, said Fresnel lens having a plurality of lens elements on a base surface, each lens element having a refracting surface and a riser surface, the riser surface of a first of said elements intersecting said bas surface and the refracting surface of a contiguous one of said lens elements along a line, wherein each of said riser surfaces is at an optimal riser angle with respect to said base, said optimal riser angle varying as a function of the distance of said riser surface from the center of said Fresnel lens; and wherein said extended light source comprises a first, second and third projection tube, said first projection tube emitting said first extreme ray and said third projection tube emitting said second extreme ray.

12. A Fresnel lens in combination with an extended light source emitting a first extreme ray and a second extreme ray at respective extremities thereof, said Fresnel lens having a plurality of lens elements on a base surface, each lens element having a refracting surface and a riser surface, the riser surface of a first of said elements intersecting said base surface and the refracting surface of a contiguous one of said lens elements along a line, wherein each of said riser surfaces is at an optimal riser angle with respect to said base, said optimal riser angle varying as a function of the distance of said riser surface from the center of said Fresnel lens; and wherein said optimal riser angle is the riser angle minimizing the light loss through said Fresnel lens.

* * * * *